United States Patent
Klatt (10) Patent No.: US 9,608,782 B2
(45) Date of Patent: Mar. 28, 2017

(54) METHOD, SYSTEM, ACCESS POINT AND COMPUTER PROGRAM PRODUCT FOR ENHANCING THE USABLE BANDWIDTH BETWEEN OF A TELECOMUNICATIONS NETWORK AND A USER EQUIPMENT

(75) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 132 days.

(21) Appl. No.: 14/116,356

(22) PCT Filed: May 8, 2012

(86) PCT No.: PCT/EP2012/001973
§ 371 (c)(1),
(2), (4) Date: Nov. 8, 2013

(87) PCT Pub. No.: WO2012/152430
PCT Pub. Date: Nov. 15, 2012

(65) Prior Publication Data
US 2014/0071937 A1  Mar. 13, 2014

(30) Foreign Application Priority Data

May 10, 2011  (WO) ................. PCT/EP2011/002322

(51) Int. Cl.
*H04L 5/00* (2006.01)
*H04W 16/14* (2009.01)
*H04W 88/06* (2009.01)

(52) U.S. Cl.
CPC ............. *H04L 5/003* (2013.01); *H04L 5/001* (2013.01); *H04W 16/14* (2013.01); *H04W 88/06* (2013.01)

(58) Field of Classification Search
CPC ........ H04L 5/001; H04L 5/003; H04W 16/14; H04W 88/06
See application file for complete search history.

(56) References Cited

U.S. PATENT DOCUMENTS 7,512,094 B1 * 3/2009 Linebarger ............ H04W 48/18
370/329
2007/0060050 A1  3/2007 Lee et al.
(Continued)

FOREIGN PATENT DOCUMENTS

JP  2004007279 A  1/2004
JP  2008514068 A  5/2008
(Continued)

*Primary Examiner* — Redentor Pasia
(74) *Attorney, Agent, or Firm* — Leydig, Voit & Mayer, Ltd.

(57) ABSTRACT

A method for enhancing usable bandwidth between an access point of a radio access network of a telecommunications network and a User Equipment of a subscriber of the telecommunications network, in which the User Equipment and the access point are configured to mutually communicate based on a standardized mobile communication technology using carrier aggregation of at least a first communication carrier having a first carrier frequency and a second communication carrier having a second carrier frequency. The first carrier frequency is a standardized and licensed frequency and is related to the standardized mobile communication technology. An antenna device of the access point transmits and/or receives radio frequency signals to and/or from the User Equipment.

14 Claims, 2 Drawing Sheets

(56) References Cited

U.S. PATENT DOCUMENTS

| | | | |
|---|---|---|---|
| 2007/0213059 A1* | 9/2007 | Shaheen | 455/436 |
| 2008/0171570 A1 | 7/2008 | Nagao et al. | |
| 2008/0220787 A1* | 9/2008 | Stanwood et al. | 455/450 |
| 2010/0173667 A1* | 7/2010 | Hui | H04W 88/06 455/552.1 |
| 2012/0120821 A1* | 5/2012 | Kazmi | H04W 56/0005 370/252 |
| 2013/0201892 A1* | 8/2013 | Holma | H04W 76/048 370/311 |
| 2014/0043979 A1 | 2/2014 | Etemad et al. | |
| 2014/0050086 A1* | 2/2014 | Himayat et al. | 370/230 |
| 2015/0131536 A1* | 5/2015 | Kaur | H04L 5/001 370/329 |
| 2015/0223178 A1 | 8/2015 | Pietraski et al. | |

FOREIGN PATENT DOCUMENTS

| | | |
|---|---|---|
| JP | 2008172569 A | 7/2008 |
| WO | WO 2006030056 A1 | 3/2006 |
| WO | WO 2006125738 A1 | 11/2006 |

\* cited by examiner

METHOD, SYSTEM, ACCESS POINT AND COMPUTER PROGRAM PRODUCT FOR ENHANCING THE USABLE BANDWIDTH BETWEEN OF A TELECOMUNICATIONS NETWORK AND A USER EQUIPMENT

CROSS-REFERENCE TO RELATED APPLICATIONS

This application is a U.S. National Phase application under 35 U.S.C. §371 of International Application No. PCT/EP2012/001973, filed on May 8, 2012, and claims benefit to International Application No. PCT/EP2011/002322, filed on May 10, 2011. The International Application No. PCT/EP2012/001973 was published in English on Nov. 15, 2012, as WO 2012/152430 A1 under PCT Article 21(2).

FIELD

The present invention relates to a method for enhancing the usable bandwidth between on the one hand an access point of a radio access network of a telecommunications network and on the other hand a User Equipment of a subscriber of the telecommunications network. Furthermore, the present invention relates to a system for enhancing the usable bandwidth between on the one hand an access point of a radio access network of a telecommunications network and on the other hand a User Equipment of a subscriber of the telecommunications network. Furthermore, the present invention relates to an access point for enhancing the usable bandwidth between on the one hand the access point and on the other hand a User Equipment of a subscriber of the telecommunications network, to a program, and to a computer program product.

The subject matter disclosed herein relates generally to Carrier Aggregation (CA) between licensed and unlicensed frequency bands.

BACKGROUND

Carrier Aggregation is a way to bundle a number of wireless channels in order to achieve a larger aggregated bandwidth and hence a larger possible peak bitrate in cellular networks. Carrier Aggregation is defined as part of the LTE-Advanced standard in 3GPP Rel-10 [www.3gpp.org] as well as in the WiMAX (IEEE 802.16m) standard.

Carrier Aggregation is not limited to channels/bands which are adjacent, but inter-band Carrier Aggregation is also supported.

Due to the expected massive growth of mobile broadband data, cellular operators currently look at alternative solutions to manage the cost of their networks.

In contrast to the initial years of WLAN and cellular networks, where both technologies co-existed without any interaction, the standardisation organisations have developed a number of enhancements to interconnect WLAN with cellular technologies. For example I-WLAN (Inter-worked-Wireless LAN) has been added by 3GPP in its Rel-7 to provide access via WLAN and a gateway to the 3GPP system. As an enhancement to this connection between WLAN and 3GPP systems with the event of Evolved Packet System (EPS), the so-called "untrusted access" using PMIP/GTP (Proxy Mobile Internet Protocol/General Packet Radio Service (GPRS Tunnelling Protocol) or Proxy Mobile IPv6 (PMIPv6) via the S2b interface has been introduced. Even further interoperability between WLAN and Evolved Packet System (EPS) has been defined in 3GPP Rel-10 with the work on "IP flow mobility", which allows concurrent operation of a single terminal using WLAN access on the one hand, while being connected via UMTS or LTE radio network on the other. Selective IP flow routing enables an improved user experience as depending on the Quality-of-Service (QoS) or operator requirements, Internet Protocol (IP) flows can be routed selectively on the one or the other radio access. Furthermore this feature package also allows seamless authentication and seamless mobility between cellular and WLAN radio networks.

However, there is still a separation in the Internet Protocol (IP) flows between the integration between WLAN access and UMTS/LTE.

SUMMARY

In an embodiment, the present invention provides a method for enhancing usable bandwidth between an access point of a radio access network of a telecommunications network and a User Equipment of a subscriber of the telecommunications network. The User Equipment and the access point are configured to mutually communicate based on a standardized mobile communication technology using carrier aggregation of at least a first communication carrier having a first carrier frequency and a second communication carrier having a second carrier frequency. The first carrier frequency is a standardized and licensed frequency and is related to the standardized mobile communication technology. The method includes: transmitting and/or receiving, by an antenna device of the access point, radio frequency signals to and/or from the User Equipment. The transmitting and/or receiving includes: during a first time interval, transmitting and/or receiving radio frequency signals on the second carrier frequency according to the standardized mobile communication technology or according to an alternative standardized mobile communication technology; and during a second time interval, transmitting and/or receiving radio frequency signals according to a further mobile communication technology. The first time interval and the second time interval are alternating. The second carrier frequency is a frequency or frequency band in a frequency range out of the group consisting of: from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz, from 2.400 to 2.500 GHz, from 5.725 to 5.875 GHz, from 24.00 GHz to 24.25 GHz, from 61.0 GHz to 61.5 GHz, from 122 GHz to 123 GHz and from 244 GHz to 246 GHz.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides an improved manner of using an access point of a radio access network of a telecommunications network in order to enhance the usable bandwidth between the access point and a User Equipment, and to provide a method, a public land mobile network (PLMN), and a program for carrier aggregation between licensed and unlicensed bands.

The present invention provides a method for enhancing the usable bandwidth between on the one hand an access point of a radio access network of a telecommunications network, and on the other hand a User Equipment of a subscriber of the telecommunications network, wherein the User Equipment and the access point mutually communicate based on a standardized mobile communication technology using carrier aggregation of at least a first communication carrier and a second communication carrier, wherein the first communication carrier has a first carrier frequency and wherein the second communication carrier has a second carrier frequency, wherein the first carrier frequency is a standardized and licensed frequency and related to the mobile communication technology, and wherein the second carrier frequency is a frequency in a frequency range out of the following:
  from 6.765 to 6.795 MHz,
  from 13.553 to 13.567 MHz,
  from 26.957 to 27.283 MHz,
  from 40.66 to 40.70 MHz,
  from 433.05 to 434.79 MHz,
  from 902 to 928 MHz,
  from 2.400 to 2.500 GHz,
  from 5.725 to 5.875 GHz,
  from 24.00 GHz to 24.25 GHz,
  from 61.0 GHz to 61.5 GHz,
  from 122 GHz to 123 GHz and
  from 244 GHz to 246 GHz.

The present invention also provides a method for enhancing the usable bandwidth between on the one hand an access point of a radio access network of a telecommunications network, and on the other hand a User Equipment of a subscriber of the telecommunications network, wherein the User Equipment and the access point mutually communicate based on a standardized mobile communication technology using carrier aggregation of at least a first communication carrier and a second communication carrier, wherein the first communication carrier has a first carrier frequency and wherein the second communication carrier has a second carrier frequency, wherein the first carrier frequency is a standardized and licensed frequency and related to the mobile communication technology, wherein an antenna device of the access point is used for transmitting radio frequency signals to the User Equipment and/or for receiving radio frequency signals from the User Equipment, wherein during a first time interval, the antenna device is used for transmitting and/or receiving radio frequency signals on the second carrier frequency and
  according to the standardized mobile communication technology, or
  according to an alternative standardized mobile communication technology,
wherein during a second time interval, the antenna device is used for transmitting and/or receiving radio frequency signals according to a further mobile communication technology, wherein the first time interval and the second time interval are alternating, and wherein the second carrier frequency is a frequency in a frequency range out of the following:
  from 6.765 to 6.795 MHz,
  from 13.553 to 13.567 MHz,
  from 26.957 to 27.283 MHz,
  from 40.66 to 40.70 MHz,
  from 433.05 to 434.79 MHz,
  from 902 to 928 MHz,
  from 2.400 to 2.500 GHz,
  from 5.725 to 5.875 GHz,
  from 24.00 GHz to 24.25 GHz,
  from 61.0 GHz to 61.5 GHz,
  from 122 GHz to 123 GHz and
  from 244 GHz to 246 GHz.

Thereby, it is advantageously possible to use the mobile communication technology not only in the respective standardized and licensed radio frequency bands of a provider or an operator of the telecommunications network but also to use that same mobile communication technology in a frequency range outside of the standardized and licensed radio frequency bands for that specific mobile communication technology. This means that an aggregation of a wireless link is proposed which uses licensed bands and an aggregation link which used an unlicensed band. For example, it is possible to use frequencies (as a second carrier frequency) of the ISM frequency band to establish a communication link according to the Long Term Evolution (LTE) or Long Term Evolution advanced (LTE advanced) communication technologies such that carrier aggregation is realized between
  a first carrier having a first carrier frequency within the standardized (and licensed by the network operator or provider) part of the spectrum, and
  a second carrier having a second carrier frequency within an unlicensed part of the radio frequency spectrum.

Furthermore, by using the antenna device during the first time interval for transmitting and/or receiving radio frequency signals on the second carrier frequency and
  according to the standardized mobile communication technology, or
  according to an alternative standardized mobile communication technology,
it is advantageously possible to use on the second carrier frequency
  a first cellular mobile communication technology, typically used on licensed bands, (i.e. the standardized mobile communication technology), e.g. LTE, which is also used on the first carrier frequency, or, alternatively, to use
  a second cellular mobile communication technology typically used on licensed bands (i.e. the alternative standardized mobile communication technology), e.g. HSPA/HSPE+, which is not used on the first carrier frequency, or, alternatively, to use
  a second cellular mobile communication technology typically used on unlicensed bands both for the first time interval and for the second time interval (i.e. the alternative standardized mobile communication technology corresponds to the further mobile communication technology), e.g. WLAN, which is likewise not used on the first carrier frequency.

In the context of the present invention, an antenna device comprises
  an antenna element and a baseband unit,
wherein the antenna element is used for transmitting electromagnetic RF signals that are provided by the baseband unit as electrical signals to the antenna element (transmission path), and wherein the antenna element is used for receiving electromagnetic RF signals that are received and processed by the baseband unit as electrical signals (reception path).

According to the present invention, it is preferred that the second carrier frequency is an unlicensed frequency, especially a frequency of the ISM-radio frequency band (Industrial Scientific and Medical radio frequency band).

Furthermore, it is preferred according to the present invention that the first carrier frequency is a licensed frequency assigned to be used by the telecommunications network.

In the context of the present invention, the terms licensed frequency and licensed band refer to a frequency or frequency band which is for example defined for utilisation with UMTS/HSPA or LTE radio technology, defined in [3GPP TS 25.101 and 3GPP TS 36.101] respectively.

Furthermore in the context of the present invention, the terms unlicensed frequency, unlicensed band or ISM-radio frequency band refer to the bands defined for Industry, Science and Medical application ("ISM bands") in which wireless technologies like Bluetooth or Wireless LAN (WLAN/WiFi) but also microwave ovens or the like are operated.

The carrier aggregation concept (CA) here is exemplarily described—but not limited to—using the 3GPP concept of LTE-Advanced carrier aggregation and the 3GPP notation. An overview of LTE-A carrier aggregation and the used terminology can be found in [3GPP TS 36.300v10.0.0].

The key elements of the 3GPP Release 10 carrier aggregation is the usage of a so-called Primary Cell (PCell) which uses LTE radio technology and acts as a kind of anchor. It also acts as the control instance for the connection towards the UE using CA. For the aggregation of additional bandwidth the so-called additional Component Carrier (CC) on a Secondary Cell (SCell) is used. An aggregated communication connection consists of a single PCell plus at least a single SCell to combine the capabilities (bandwidth) of the PCell and the at least one SCell.

Carrier aggregation allows the expansion of effective bandwidth delivered to a user terminal through concurrent utilization of radio resources across multiple carriers. Multiple component carriers are aggregated to form a larger overall transmission bandwidth.

According to a further preferred embodiment of the present invention, an antenna device of the access point is used for transmitting radio frequency signals to the User Equipment and/or for receiving radio frequency signals from the User Equipment, wherein during a first time interval, the antenna device is used for transmitting and/or receiving radio frequency signals on the second carrier frequency and according to the standardized mobile communication technology, wherein during a second time interval, the antenna device is used for transmitting and/or receiving radio frequency signals according to a further mobile communication technology, and wherein the first time interval and the second time interval are alternating, wherein especially the further mobile communication technology is a technology according one of the IEEE-802.11-family of mobile communication standards.

Thereby, is particularly advantageous according to the present invention to be able to use the access point both for a transmission—using carrier aggregation—applying the mobile communication technology and (at other points in time or within other time slots of an alternating time slot scheme) applying the further mobile communication technology.

According to the present invention, it is particularly preferred to implement an alternating time slot scheme such that the first time interval and the second time interval occur or alternate within a predetermined time period of, e.g., 10 seconds, or 1 second or 500 milliseconds. It is also possible and preferred according to the present invention that within the predetermined time period, two first time intervals occur but only one second time interval or vice versa. Furthermore, other alternating time slot schemes can be applied such that—within the predetermined time period—a first number of first time intervals and a second number of second time intervals occur, the first number and the second number being integers starting at 1 (i.e. 1, 2, 3, 4, etc.).

It is furthermore preferred according to the present invention that the mobile communication technology is one out of the following:
  an Evolved Universal Terrestrial Radio Access Network (E-UTRAN) technology,
  a Long Term Evolution (LTE) technology,
  a Long Term Evolution advanced (LTE advanced) technology,
  a Universal Mobile Telecommunication System (UMTS) technology,
  a HSPA (High Speed Packet Access),
  a HSPA+ (High Speed Packet Access plus) technology
  a WiMAX (Worldwide Interoperability for Microwave Access) technology.

According to the present invention, it is furthermore preferred that the carrier aggregation is used to enhance the usable bandwidth in uplink direction from the User Equipment to the telecommunications network and/or wherein the carrier aggregation is used to enhance the usable bandwidth in downlink direction from the telecommunications network to the User Equipment.

Thereby, it is advantageously possible according to the present invention that the enhancement of usable bandwidth is not restricted to either an uplink or a downlink connection, but that also both in uplink and downlink direction, an inventive enhancement of the usable bandwidth is possible.

The present invention also relates to a system for enhancing the usable bandwidth between on the one hand an access point of a radio access network of a telecommunications network, and on the other hand a User Equipment of a subscriber of the telecommunications network, wherein the User Equipment and the access point mutually communicate based on a standardized mobile communication technology using carrier aggregation of at least a first communication carrier and a second communication carrier, wherein the first communication carrier has a first carrier frequency and wherein the second communication carrier has a second carrier frequency, wherein the first carrier frequency is a standardized and licensed frequency and related to the mobile communication technology, and wherein the second carrier frequency is a frequency in a frequency range out of the following:
  from 6.765 to 6.795 MHz,
  from 13.553 to 13.567 MHz,
  from 26.957 to 27.283 MHz,
  from 40.66 to 40.70 MHz,
  from 433.05 to 434.79 MHz,
  from 902 to 928 MHz,
  from 2.400 to 2.500 GHz,
  from 5.725 to 5.875 GHz, from 24.00 GHz to 24.25 GHz,
from 61.0 GHz to 61.5 GHz,
from 122 GHz to 123 GHz and
from 244 GHz to 246 GHz.

According to the present invention, it is—also with regard to the inventive system—preferred:

that the second carrier frequency is an unlicensed frequency, especially a frequency of the ISM-radio frequency band (Industrial Scientific and Medical radio frequency band) and/or that the first carrier frequency is a licensed frequency assigned to be used by the telecommunications network and/or that the mobile communication technology is one out of the following:
  an Evolved Universal Terrestrial Radio Access Network (E-UTRAN) technology,
  a Long Term Evolution (LTE) technology,
  a Long Term Evolution advanced (LTE advanced) technology,
  a Universal Mobile Telecommunication System (UMTS) technology,
  a HSPA (High Speed Packet Access),
  a HSPA+ (High Speed Packet Access plus) technology
  a WiMAX (Worldwide Interoperability for Microwave Access) technology.

Furthermore, it is preferred—also with respect to the inventive system—that an antenna device of the access point is used for transmitting radio frequency signals to the User Equipment and/or for receiving radio frequency signals from the User Equipment, wherein during a first time interval, the antenna device is used for transmitting and/or receiving radio frequency signals on the second carrier frequency and according to the standardized mobile communication technology, wherein during a second time interval, the antenna device is used for transmitting and/or receiving radio frequency signals according to a further mobile communication technology, and wherein the first time interval and the second time interval are alternating, wherein especially the further mobile communication technology is a technology according one of the IEEE-802.11-family of mobile communication standards.

The present invention also relates to an access point for enhancing the usable bandwidth between on the one hand the access point of a radio access network of a telecommunications network, and on the other hand a User Equipment of a subscriber of the telecommunications network, wherein the User Equipment and the access point mutually communicate based on a standardized mobile communication technology using carrier aggregation of at least a first communication carrier and a second communication carrier, wherein the first communication carrier has a first carrier frequency and wherein the second communication carrier has a second carrier frequency, wherein the first carrier frequency is a standardized and licensed frequency and related to the mobile communication technology, and wherein the second carrier frequency is a frequency in a frequency range out of the following:
  from 6.765 to 6.795 MHz,
  from 13.553 to 13.567 MHz,
  from 26.957 to 27.283 MHz,
  from 40.66 to 40.70 MHz,
  from 433.05 to 434.79 MHz,
  from 902 to 928 MHz,
  from 2.400 to 2.500 GHz,
  from 5.725 to 5.875 GHz,
  from 24.00 GHz to 24.25 GHz,
  from 61.0 GHz to 61.5 GHz,
  from 122 GHz to 123 GHz and
  from 244 GHz to 246 GHz.

Furthermore, it is preferred—also with respect to the inventive access point—that an antenna device of the access point is used for transmitting radio frequency signals to the User Equipment and/or for receiving radio frequency signals from the User Equipment, wherein during a first time interval, the antenna device is used for transmitting and/or receiving radio frequency signals on the second carrier frequency and according to the standardized mobile communication technology, wherein during a second time interval, the antenna device is used for transmitting and/or receiving radio frequency signals according to a further mobile communication technology, and wherein the first time interval and the second time interval are alternating, wherein especially the further mobile communication technology is a technology according one of the IEEE-802.11-family of mobile communication standards.

Furthermore, the present invention relates to a User Equipment for enhancing the usable bandwidth between on the one hand an access point of a radio access network of a telecommunications network, and on the other hand the User Equipment of a subscriber of the telecommunications network, wherein the User Equipment and the access point mutually communicate based on a standardized mobile communication technology using carrier aggregation of at least a first communication carrier and a second communication carrier, wherein the first communication carrier has a first carrier frequency and wherein the second communication carrier has a second carrier frequency, wherein the first carrier frequency is a standardized and licensed frequency and related to the mobile communication technology, and wherein the second carrier frequency is a frequency in a frequency range out of the following:
  from 6.765 to 6.795 MHz,
  from 13.553 to 13.567 MHz,
  from 26.957 to 27.283 MHz,
  from 40.66 to 40.70 MHz,
  from 433.05 to 434.79 MHz,
  from 902 to 928 MHz,
  from 2.400 to 2.500 GHz
  from 5.725 to 5.875 GHz,
  from 24.00 GHz to 24.25 GHz,
  from 61.0 GHz to 61.5 GHz,
  from 122 GHz to 123 GHz and
  from 244 GHz to 246 GHz.

Additionally, the present invention relates to a program comprising a computer readable program code which, when executed on a computer, causes the computer to perform a method according to the present invention.

Furthermore, the present invention relates to a computer program product for enhancing the usable bandwidth between on the one hand an access point of a radio access network of a telecommunications network and on the other hand a User Equipment, the computer program product comprising a computer-readable storage medium having computer-readable program instructions embodied in the medium for executing a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Figure 1:
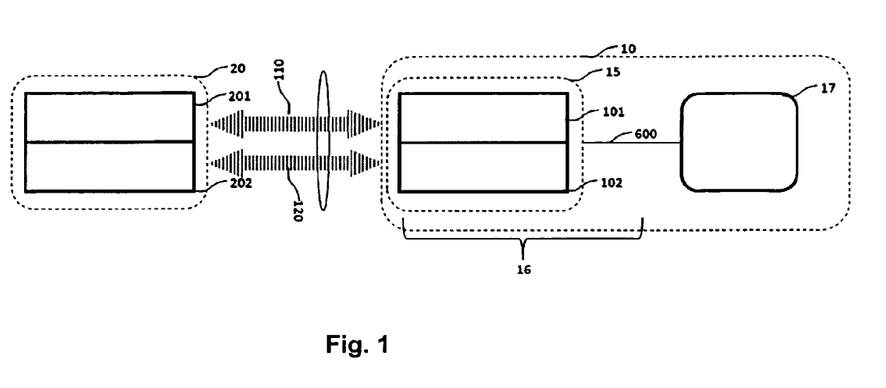
FIG. 1 schematically illustrates a representation of a communication situation using carrier aggregation.

In FIG. 1, a representation of a communication situation using carrier aggregation is schematically represented. A User Equipment 20 is connected with a telecommunications network 10 via a radio access network 16 of the telecommunications network 10. The telecommunications network 10 typically also comprises a core network 17 linked to the radio access network 16 via a communication link 600. A radio frequency communication link, providing communication services to the User Equipment 20, is maintained between an access point 15 of the radio access network 16 of the telecommunications network 10 on the one hand and the User Equipment 20 on the other hand. According to the present invention, a first communication carrier and a second communication carrier are aggregated according to a carrier aggregation scheme to provide an enhanced usable bandwidth between the User Equipment 20 and the access point 15. The first communication carrier has a first carrier frequency 110 and the second communication carrier has a second carrier frequency 120. It is to be understood in the context of the present invention that the terms "first carrier frequency 110" and "second carrier frequency 120" are also meant to designated a "first carrier frequency band 110" and a "second carrier frequency band 120" in case that such frequency bands are to be used according to the used mobile communication technology.

In the context of the present invention, the access point 15 is a device providing access to the telecommunications network 10 for the User Equipment 20. Especially, such an access point 15 can be an eNodeB according to the Long Term Evolution (LTE) technology or a femto cell eNodeB or the like. Via the first communication carrier and first carrier frequency 110, a PCell is realized or provided to the User Equipment 20. Via the second communication carrier and second carrier frequency 120, a SCell is realized or provided to the User Equipment 20. According to the present invention, the access point 15 comprises either an antenna device for providing both the radio link or air interface for the first communication carrier, and the radio link or air interface for the second communication carrier. Alternatively, the access point 15 comprises the antenna device in the form of a first part (for providing the radio link or air interface for the first communication carrier) of the antenna device and a second part (for providing the radio link or air interface for the second communication carrier) of the antenna device, wherein such parts of the antenna device are, in the following, also called first antenna device and second antenna device respectively.

According to the example of FIG. 1, the access point 15 comprises a first antenna device 101 for providing the radio link or air interface for the first communication carrier, and a second antenna device 102 for providing the radio link or air interface for the second communication carrier. The User Equipment 20 can comprise a third antenna device 201 for providing the radio link or air interface for the first communication carrier, and a fourth antenna device 202 for providing the radio link or air interface for the second communication carrier. It is to be understood that the "first antenna device", "second antenna device", "third antenna device" and/or "fourth antenna device" can comprise a multitude of antennas (or antenna elements) to realize MIMO (multiple input, multiple output) functionality.

It is to be understood that the antenna capabilities of the access point 15 and/or of the User Equipment 20 do not necessarily be split between two physically distinct antenna devices (first and second antenna device for the access point/third and fourth antenna device for the User Equipment), but it is possible to provide in the access point 15 or in the User Equipment 20 or in both an integrated antenna device such that both the first communication carrier and the second communication carrier are handled (i.e. the air interface provided) by the integrated antenna device. Furthermore one antenna at the access point 15 or the User Equipment 20 can also be understood as multiple antennas in case MIMO technologies are used (MIMO=Multiple Input Multiple Output antenna).

Figure 2:
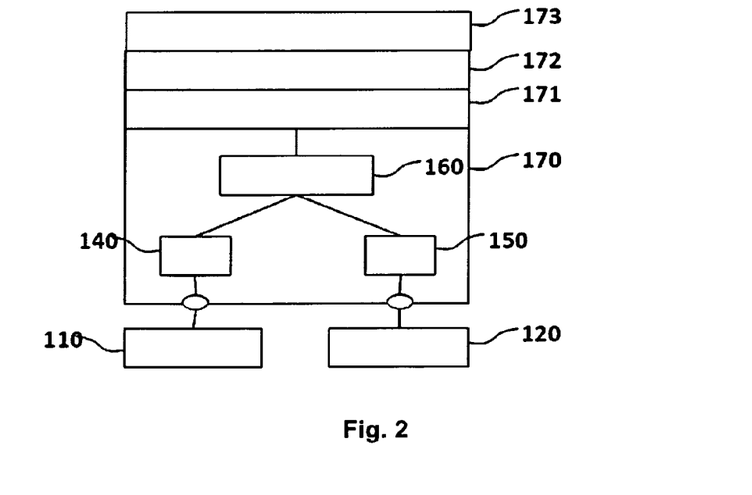
FIG. 2 schematically illustrates the aggregation of resources on the MAC layer of the OSI model.

In FIG. 2, the aggregation of resources on the MAC layer of the OSI model is schematically shown. The first carrier frequency 110 (or first communication carrier) provides a physical PCell (PCell PHY) communication link. The second carrier frequency 120 (or second communication carrier) provides a physical SCell (SCell PHY) communication link. On a MAC layer 170 (Media Access Control) of the OSI (Open System Interconnection) communication model, the carrier aggregation is realized by a Hybrid Automatic Repeat Request (HARQ) entity 140 related to the first communication carrier, a HARQ 150 related to the second communication carrier, and a multiplexing entity 160.

Toward higher level layers of the OSI model, the further layers above the MAC layer 170, namely the Radio Link Control (RLC) layer 171, the Packet Data Convergence Protocol (PDCP) layer 172 and the Internet Protocol (IP) layer 173 are schematically shown in FIG. 2.

Figure 3:
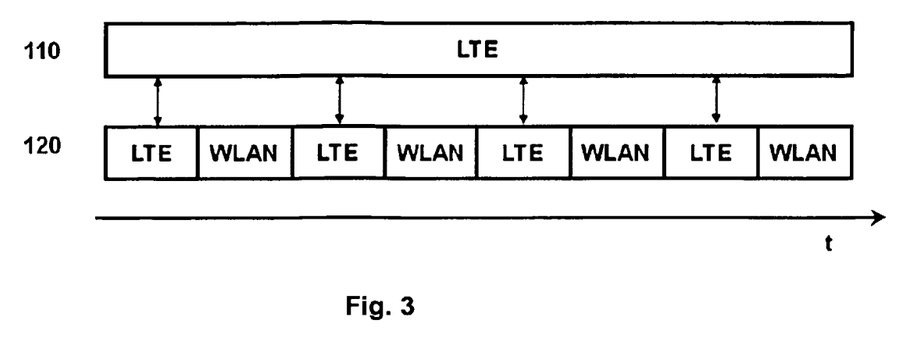
FIG. 3 schematically illustrates an example of time slot sharing between different mobile communication technologies.

In FIG. 3, an example of time slot sharing between different mobile communication technologies is schematically shown for the example of using a communication ling according to the Long Term Evolution (LTE) communication technology and according to the WLAN communication technology. The first communication carrier on the first carrier frequency 110 (and hence the associated antenna device), providing the PCell functionality, works according to the Long Term Evolution (LTE) communication technology (of course, alternatively the use of another communication technology could implemented). The second communication carrier on the second carrier frequency 120 (and hence the associated antenna device), providing the SCell functionality, works     according to the Long Term Evolution (LTE) communication technology (alternatively, the use of another communication technology could implemented) during one part of the available time slots (or during first time intervals), and according to the wireless local area network communication technology (alternatively the use of another communication technology could implemented) during another part of the available time slots (or during second time intervals). The first and second time slots preferably alternate such that alternately both radio links can be used. Independently of the schematically shown identical time durations there is no limitation in time allocation for the operation of the first and the second communication technology.

According to the present invention and in contrast to the state of the art, carrier aggregation is performed between a PCell using a licensed band and at least one SCell using an unlicensed band.

Alternatively it is also possible to use an aggregation of a first technology operating in at least a single licensed band, a second technology operating in at least a single licensed band and either the first or the second technology operating in at least a first unlicensed band.

In order to efficiently bundle licensed and unlicensed bands, the present invention provides that while a PCell is configured using LTE on licensed band, the unlicensed band also applies the same radio technology LTE as SCell.

In an alternative embodiment, while a PCell is configured using LTE on licensed band, the unlicensed band applies a different cellular radio technology than LTE as SCell (e.g., HSPA/HSPA+).

In another alternative embodiment, while a PCell is configured using LTE on licensed band, the unlicensed band applies a different cellular radio technology than LTE as SCell (e.g., WLAN).

This concept of using a SCell on unlicensed bands allows the opportunistic boosting and selective traffic flow control using the capacities of both accesses.

Due to the regulatory limitations in terms of maximum allowed transmission power (Tx power) in the unlicensed bands, which are typically lower than the allowed Tx Powers on licensed bands, this kind of opportunistic carrier aggregation is especially useful, when small cells are utilised. Depending on the national regulations, the maximum achievable range of a cells using unlicensed spectrum is limited to a couple of 100 m (ETSI regulation for Europe) and about 2 km for the North-American FCC regulation (exemplarily for the 2.4 GHz ISM band).

The present invention also allows the control of resource allocation in the unlicensed band being controlled by the cellular technology using the PCell. I.e., any allocation of resources of the SCell (using the unlicensed band) is controlled by the PCell.

Traditional interworking between licensed technologies such as LTE and unlicensed technologies, such as WLAN, allow at best a selective routing of IP flows to a UE, including the control by the cellular operator as to which radio technology a particular IP flow is mapped. So, particularly, a single IP flow is already mapped to either the licensed or the unlicensed radio technology, but not to both. In other words, the flows are controlled on the IP level and not in the lower layers of the stack.

In contrast to conventional systems, the present invention calls for carrier aggregation between licensed and unlicensed bands, where the aggregation of resources is done in the MAC layer (see FIG. 2).

An embodiment of the present invention uses the additional component carrier in the unlicensed band for the same mode of operation as the component carrier in the licensed band. This is either the Frequency Division Duplexing (FDD) or the Time Division Duplexing (TDD) mode.

An alternative of the present invention uses the additional component carrier in the unlicensed band for a different mode of operation than the component carrier in the licensed band. E.g. the component carrier in the licensed band operates in the Frequency Division Duplexing (FDD) mode while the component carrier in the unlicensed band operates in the Time Division Duplexing (TDD) mode. Alternatively the component carrier in the licensed band operates in the Time Division Duplexing (TDD) mode while the component carrier in the unlicensed band operates in the Frequency Division Duplexing (FDD) mode.

A specific form of the mode of operation is the configuration, where the component carrier in the licensed band operates in the Frequency Division Duplexing (FDD) mode while the component carrier in the unlicensed band operates also in the Frequency Division Duplexing (FDD) mode, but does not provide an associated uplink operating in Frequency Division Duplexing (FDD) mode in the unlicensed band. I.e. this configuration allocates all or a large part of the unlicensed spectrum in downlink only to improve the downlink performance by using additional downlink spectrum, while the required uplink in Frequency Division Duplexing (FDD) mode of operation is associated solely or at least partly to the component carrier using the licensed band (i.e. using the first carrier frequency 110).

Similarly the inverse configuration is possible, where the component carrier on the unlicensed band (i.e. the second carrier frequency 120) only operates in uplink direction using Frequency Division Duplexing (FDD) mode, while the required downlink in Frequency Division Duplexing (FDD) mode of operation is associated solely or at least partly to the component carrier using the licensed band.

The invention also provides a method where a part of the radio modem typically operating in unlicensed band (e.g. the part of the communication device which provides for example WLAN connectivity) is dynamically reconfigured in order to operate in a mode typically used in licensed bands (e.g. HSPA/HSPA+ or LTE/LTE-A). By doing this, part of the available (radio) hardware can be used to aggregate available unlicensed bands (i.e. the second communication carrier) with a licensed band (i.e. the first communication carrier) in a carrier aggregation mode of operation, or work simultaneously in typical unlicensed mode (WLAN mode).

Therefore, the present invention provides the arrangement of a base station (or access point) providing simultaneous connectivity of a radio node (or User Equipment) using an licensed band radio technology, such as for example HSPA/HSPA+ or LTE/LTE-A, and in addition a radio transmitter entity which can be configured in unlicensed mode radio technology (e.g. WLAN) or licensed mode of radio technology (as for example HSPA/HSPA+ or LTE/LTE-A).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to one or more embodiments of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for enhancing usable bandwidth between an access point of a radio access network of a telecommunications network and a User Equipment of a subscriber of the telecommunications network, the method comprising:
    transmitting and/or receiving, by an antenna device of the access point, radio frequency signals to and/or from the User Equipment, wherein the User Equipment and the access point are configured to mutually communicate based on a standardized mobile communication technology using carrier aggregation of at least a first communication carrier having a first carrier frequency and a second communication carrier having a second carrier frequency, wherein the first communication carrier and the second communication carrier are aggregated according to a carrier aggregation scheme to provide an enhanced usable bandwidth between the User Equipment and the access point, and wherein the first carrier frequency is a standardized and licensed frequency and is related to the standardized mobile communication technology;
    wherein the transmitting and/or receiving comprises:
        during a first time interval, transmitting and/or receiving radio frequency signals on the second carrier frequency according to the standardized mobile communication technology or according to an alternative standardized mobile communication technology; and
        during a second time interval, transmitting and/or receiving radio frequency signals on the second carrier frequency according to a further mobile communication technology;
    wherein the first time interval and the second time interval are alternating;
    wherein the second carrier frequency is a frequency or frequency band in a frequency range selected from the group consisting of: from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz, from 2.400 to 2.500 GHz, from 5.72.5 to 5.875 GHz, from 24.00 GHz to 24.25 GHz, from 61.0 GHz to 61.5 GHz, from 122 GHz to 123 GHz and from 244 GHz to 246 GHz.

2. The method of claim 1, wherein the second carrier frequency is an unlicensed frequency and is a frequency of the Industrial Scientific and Medical (ISM) radio frequency band.

3. The method of claim 1, Wherein the first carrier frequency is a licensed frequency assigned to be used by the telecommunications network.

4. The method of claim 1, wherein the further mobile communication technology is a technology according to one of the IEEE 802.11 family of mobile communication standards.

5. The method of claim 1, wherein the mobile communication technology is selected from the group consisting of:
    an Evolved Universal Terrestrial Radio Access Network (E-UTRAN) technology,
    a Long Term Evolution (LTE) technology,
    a Long Term Evolution advanced (LTE advanced) technology,
    a Universal Mobile Telecommunication System (UMTS) technology,
    a High Speed Packet Access (HSPA) technology,
    a High Speed Packet Access plus (HSPA+) technology, and
    a Worldwide Interoperability for Microwave Access (WiMAX) technology.

6. The method of claim 1, wherein the carrier aggregation is used to enhance the usable bandwidth in uplink direction from the User Equipment to the telecommunications network and/or wherein the carrier aggregation is used to enhance the usable bandwidth in downlink direction from the telecommunications network to the User Equipment.

7. A system for enhancing usable bandwidth between an access point of a radio access network of a telecommunications network and a User Equipment of a subscriber of the telecommunications network, the system comprising:
    the User Equipment and the access point, wherein the User Equipment and the access point are configured to mutually communicate based on a standardized mobile communication technology using carrier aggregation of at least a first communication carrier having a first carrier frequency and a second communication carrier having a second carrier frequency, wherein the first communication carrier and the second communication carrier are aggregated according to a carrier aggregation scheme to provide an enhanced usable bandwidth between the User Equipment and the access point;
    wherein the first carrier frequency is a standardized and licensed frequency and is related to the standardized mobile communication technology;
    wherein an antenna device of the access point is configured for transmitting and/or receiving radio frequency signals to and/or from the User Equipment, wherein the transmitting and/or receiving comprises:
        during a first time interval, transmitting and/or receiving radio frequency signals on the second carrier frequency according to the standardized mobile communication technology or according to an alternative standardized mobile communication technology; and
        during a second time interval, transmitting and/or receiving radio frequency signals on the second carrier frequency according to a further mobile communication technology;
    wherein the first time interval and the second time interval are alternating; and
    wherein the second carrier frequency is a frequency or frequency band in a frequency range selected from the group consisting of: from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz, from 2.400 to 2.500 GHz, from 5.725 to 5.875 GHz, from 24.00 GHz to 24.25 GHz, from 61.0 GHz to 61.5 GHz, from 122 GHz to 123 GHz and from 244 GHz to 246 GHz.

8. The system of claim 7, wherein the first carrier frequency is a licensed frequency assigned to be used by the telecommunications network.

9. The system of claim 7, wherein the further mobile communication technology is a technology according to one of the IEEE 802.11 family of mobile communication standards.

10. The system of claim 7, wherein the mobile communication technology is selected from the group consisting of:
  an Evolved Universal Terrestrial Radio Access Network (E-UTRAN) technology,
  a Long Term Evolution (LTE) technology,
  a Long Term Evolution advanced (LTE advanced) technology,
  a Universal Mobile Telecommunication System (UMTS) technology,
  a High Speed Packet Access (HSPA) technology,
  a High Speed Packet Access plus (HSPA+) technology, and
  a Worldwide Interoperability for Microwave Access (Wi-MAX) technology.

11. An access point for enhancing usable bandwidth between an access point of a radio access network of a telecommunications network and a User Equipment of a subscriber of the telecommunications network, the access point comprising:
  an antenna device, configured for transmitting and/or receiving radio frequency signals to and/or from the User Equipment, wherein the User Equipment and the access point are configured to mutually communicate based on a standardized mobile communication technology using carrier aggregation of at least a first communication carrier having a first carrier frequency and a second communication carrier having a second carrier frequency, wherein the first communication carrier and the second communication carrier are aggregated according to a carrier aggregation scheme to provide an enhanced usable bandwidth between the User Equipment and the access point, and wherein the first carrier frequency is a standardized and licensed frequency and is related to the standardized mobile communication technology;
  wherein the transmitting and/or receiving comprises:
    during a first time interval, transmitting and/or receiving radio frequency signals on the second carrier frequency according to the standardized mobile communication technology or according to an alternative standardized mobile communication technology; and
    during a second time interval, transmitting and/or receiving radio frequency signals on the second carrier frequency according to a further mobile communication technology;
  wherein the first time interval and the second time interval are alternating; and
  wherein the second carrier frequency is a frequency or frequency band in a frequency range selected from the group consisting of: from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz, from 2.400 to 2.500 GHz, from 5.725 to 5.875 GHz, from 24.00 GHz to 24.25 GHz. from 61.0 GHz to 61.5 GHz, from 122 GHz to 123 GHz and from 244 GHz to 246 GHz.

12. The access point of claim 11, wherein the further mobile communication technology is a technology according to one of the IEEE 802.11 family of mobile communication standards.

13. A User Equipment for enhancing usable bandwidth between an access point of a radio access network of a telecommunications network and the User Equipment of a subscriber of the telecommunications network, the User Equipment comprising:
  an antenna device, configured for transmitting and/or receiving radio frequency signals to and/or from the access point, wherein the User Equipment and the access point are configured to mutually communicate based on a standardized mobile communication technology using carrier aggregation of at least a first communication carrier having a first carrier frequency and a second communication carrier having a second carrier frequency, wherein the first communication carrier and the second communication, carrier are aggregated according to a carrier aggregation scheme to provide an enhanced usable bandwidth between the User Equipment and the access point, and wherein the first carrier frequency is a standardized and licensed frequency and is related to the standardized mobile communication technology;
  wherein the transmitting and/or receiving comprises:
    during a first time interval, transmitting and/or receiving radio frequency signals on the second carrier frequency according to the standardized mobile communication technology or according to an alternative standardized mobile communication technology; and
    during a second time interval, transmitting and/or receiving radio frequency signals on the second carrier frequency according to a further mobile communication technology;
  wherein the first time interval and the second time interval are alternating; and
  wherein the second carrier frequency is a frequency or frequency band in a frequency range selected from the group consisting of from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz, from 2.400 to 2.500 GHz, from 5.725 to 5.875 GHz, from 24.00 GHz to 24.25 GHz, from 61.0 GHz to 61.5 GHz, from 122 GHz to 123 GHz and from 244 GHz to 246 GHz.

14. A non-transitory processor-readable medium having processor-executable instructions stored thereon for enhancing usable bandwidth between an access point of a radio access network of a telecommunications network and a User Equipment of a subscriber of the telecommunications network, the processor-executable instructions, when executed by a processor, causing the following to be performed:
  transmitting and/or receiving, by an antenna device of the access point, radio frequency signals to and/or from the User Equipment, wherein the User Equipment and the access point are configured to mutually communicate based on a standardized mobile communication technology using carrier aggregation of at least a first communication carrier having a first carrier frequency and a second communication carrier having a second carrier frequency, wherein the first communication carrier and the second communication carrier are aggregated according to a carrier aggregation scheme to provide an enhanced usable bandwidth between the User Equipment and the access point, and wherein the first carrier frequency is a standardized and licensed frequency and is related to the standardized mobile communication technology;

wherein the transmitting and/or receiving comprises:
  during a first time interval, transmitting and/or receiving radio frequency signals on the second carrier frequency according to the standardized mobile communication technology or according to an alternative standardized mobile communication technology; and
  during a second time interval, transmitting and/or receiving radio frequency signals on the second carrier frequency according to a further mobile communication technology;

wherein the first time interval and the second time interval are alternating; and wherein the second carrier frequency is a frequency or frequency band in a frequency range selected from the group consisting of: from 6.765 to 6.795 MHz, from 13.553 to 13.567 MHz, from 26.957 to 27.283 MHz, from 40.66 to 40.70 MHz, from 433.05 to 434.79 MHz, from 902 to 928 MHz; from 2.400 to 2.500 GHz, from 5.725 to 5.875 GHz, from 24.00 GHz to 24.25 GHz, from 61.0 GHz to 61.5 GHz, from 122 GHz to 123 GHz and from 244 GHz to 246 GHz.

* * * * *